United States Patent [19]

Yoshino

[11] Patent Number: 4,859,002
[45] Date of Patent: Aug. 22, 1989

[54] ANTISKID BRAKE CONTROL DEVICE
[75] Inventor: Masato Yoshino, Itami, Japan
[73] Assignee: Sumitomo Electric Industries, Ltd., Osaka, Japan
[21] Appl. No.: 216,182
[22] Filed: Jul. 6, 1988
[30] Foreign Application Priority Data Jul. 9, 1987 [JP] Japan ................................ 62-173489

[51] Int. Cl.$^4$ ................................................ B60T 8/60
[52] U.S. Cl. ..................................... 303/103; 303/100; 303/108; 303/95; 303/97; 364/426.02
[58] Field of Search ....................... 303/91, 93, 95, 96, 303/97, 98, 99, 100, 103-111, 92; 364/426

[56] References Cited

U.S. PATENT DOCUMENTS

| | | | |
|---|---|---|---|
| 4,209,203 | 6/1980 | Brearley | 303/103 X |
| 4,212,499 | 7/1980 | Jones | 303/103 |
| 4,320,460 | 3/1982 | Brearley et al. | 303/103 X |
| 4,517,647 | 5/1985 | Harada et al. | 303/108 X |
| 4,530,059 | 7/1985 | Brearley et al. | 303/97 X |
| 4,660,146 | 4/1987 | Kubo | 303/105 X |
| 4,663,715 | 5/1987 | Kubo | 303/105 X |
| 4,704,684 | 11/1987 | Kubo | 303/106 X |

Primary Examiner—Douglas C. Butler
Attorney, Agent, or Firm—Cushman, Darby & Cushman

[57] ABSTRACT

An antiskid brake control device including a hydraulic controller, a timer for measuring time periods for reducing, increasing and holding a hydraulic pressure, a counter for counting the number of changeover between increase and holding of the hydraulic pressure, a calculating device for calculating a vehicle speed, a decision device for discriminating an average vehicle deceleration into finite steps, a discrimination device for discriminating into finite steps, the time period for reducing the hydraulic pressure, a storage for storing the time periods for increasing and holding the hydraulic pressure and a changeover device for performing, when the wheels have recovered from locking, changeover between increase and holding of the hydraulic pressure in accordance with the time periods for increasing and holding the hydraulic pressure.

4 Claims, 5 Drawing Sheets

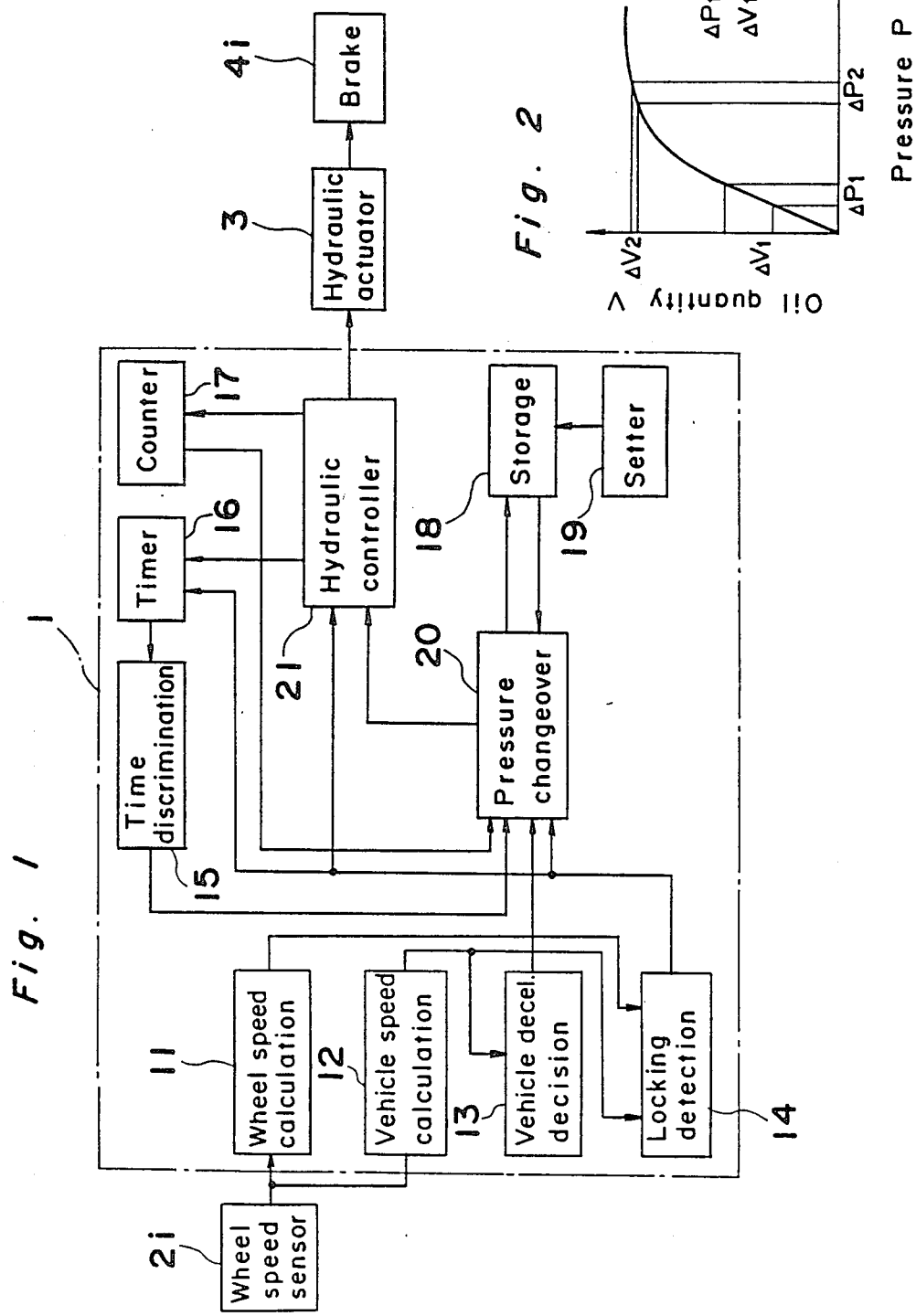

ANTISKID BRAKE CONTROL DEVICE

BACKGROUND OF THE INVENTION

The present invention relates to an antiskid brake control device which not only prevents loss of directional stability and controllability of a motor vehicle, etc. due to locking of wheels caused at the time of braking but secures a minimum braking distance.

Conventionally, in antiskid brake control devices of this kind, owing to inevitable factors such as hysteresis of application of a braking force, delay in actuation of a hydraulic control device at the time of recovering the wheels exhibiting a locking trend, from locking and in the case where locking of the wheels has progressed fully, the driver desires to recover the wheels from locking as rapidly as possible. Thus, generally, at the time when the driver has considered that the wheels are recovered from locking, a hydraulic braking pressure is reduced excessively. Hence, in the case where the hydraulic braking pressure is increased immediately after the above described reduction of the hydraulic braking pressure, it will be ordinarily desirable that the hydraulic braking pressure is initially increased rapidly at a large rate in order to regain a necessary braking force as rapidly as possible and then, is slowly increased at a small rate after achievement of the necessary braking force in order to prevent the wheels as much as possible from being locked again.

Meanwhile, in a simplest antiskid control system, since a hydraulic control device controls the hydraulic braking pressure through changeover of only two modes, i.e. a pressure increase mode and a pressure reduction mode, it is impossible to change rate of increase of the hydraulic braking pressure as described above.

In order to solve the above described problem, an antiskid brake control device has been proposed in which a hydraulic pressure control device is provided with a pressure holding mode for holding the hydraulic braking pressure without reducing or increasing the hydraulic braking pressure so as to have three mode, i.e. the pressure increase mode, the pressure reduction mode and the pressure holding modei In this known antiskid brake control device, the hydraulic braking pressure is increased in accordance with a time period of reduction of the hydraulic braking pressure immediately after recovery of the wheels from locking and subsequently, holding of the hydraulic braking pressure for a relatively long time and increase of the hydraulic braking pressure for a relatively short time are repeated alternately such that the above described demand is satisfied.

However, the following problem arises in the prior art antiskid brake control device having the three modes, i.e. the pressure increase mode, the pressure reduction mode and the pressure holding mode, in which amount of rapid increase of the hydraulic braking pressure is determined in accordance with the time period of reduction of the hydraulic braking pressure required for recovering the wheels from locking, while increase, reduction and holding of the hydraulic braking pressure are subjected to open-loop control. Namely, when the motor vehicle is running on a slippery road surface, i.e. a road surface having a low coefficient of friction $\mu$, a force which is applied from the road surface to the locked wheels so as to recover the wheels from locking is small, so that a time period for reducing the hydraulic braking pressure becomes long. In this case, the hydraulic braking pressure is required to be increased again carefully for the wheels having exhibited a symptom of recovery of the wheels from locking such that amount of rapid increase of the hydraulic braking pressure is decreased.

On the other hand, in the case of a less slippery road surface, i.e. a road surface having a high coefficient of friction $\mu$, the wheels may be locked fully due to variations in time of detection of locking of the wheels and such instantaneous phenomena as passing of the wheels through puddles of the road surface and bouncing of the wheels off a bumpy road, so that a time period for reducing the hydraulic braking pressure becomes longer. Under these conditions, large amount of rapid increase of the hydraulic braking pressure is required to be employed for the wheels having recovered from locking. However, rate of reduction of the hydraulic braking pressure becomes usually larger and smaller as the hydraulic braking pressure is higher and lower, respectively due to the fact that quantity of oil flowing through a restriction passage formed in a solenoid valve is affected by difference in pressure between opposite ends of the restriction passage and owing to characteristics of stiffness of the hydraulic braking pressure. On the other hand, rate of increase of the hydraulic braking pressure does not change between high hydraulic braking pressure and low hydraulic braking pressure so large as in reduction of the hydraulic braking pressure.

Therefore, if, in the case of both the slippery road surface and the less slippery road surface, an identical time period for increasing the hydraulic braking pressure is at all times set for an identical time period for reducing the hydraulic braking pressure, the following inconveniences are incurred. Namely, in the case of the slippery road surface, the hydraulic braking pressure is low originally, so that reduction of the hydraulic braking pressure does not progress sufficiently and thus, the hydraulic braking pressure is increased excessively. On the other hand, in the case of the less slippery road surface, the hydraulic braking pressure is originally high, so that reduction of the hydraulic braking pressure progresses rapidly and thus, the hydraulic breaking pressure is not increased sufficiently.

FIG. 2 shows a characteristic curve of stiffness of the hydraulic braking pressure. As will be seen from FIG. 2, a large quantity of the oil is necessary for increasing the hydraulic braking pressure when the hydraulic braking pressure is low, while the hydraulic braking pressure varies greatly upon minute change of quantity of the oil when the hydraulic braking pressure becomes higher.

In order to deal with the above described drawback of the open-loop control, it may be considered that, at and after the second increase of the hydraulic braking pressure, a command of increasing the hydraulic braking pressure for a short time and a command of holding the hydraulic braking pressure for a relatively long time are repeated alternately but, at the first increase of the hydraulic braking pressure, feedback control is added such that either the hydraulic braking pressure is increased while an acceleration of the wheels is not less than a predetermined value or variations of the acceleration of the wheels are so controlled as to follow a preset target. However, in this case, the hydraulic braking pressure may be readily increased excessively due to hysteresis of braking, delay in actuation of the hydraulic control device, etc. In order to issue a command of increasing, reducing or holding the hydraulic braking pressure, in which hysteresis of braking, delay in actuation of the hydraulic control device, etc. are compensated for, a number of differentiation circuits and integration circuits are required to be provided because the system is not a simple linear model. Especially, in the case where the acceleration of the wheels is measured not in an analog manner but by amount of pulses, accuracy and stability of the differentiation system are not sufficient for such compensation.

SUMMARY OF THE INVENTION

Accordingly, an essential object of the present invention is to provide an antiskid brake control device in which even if a controlled variable is not linearly proportional to a time period for executing a command in a hydraulic control device, a proper amount of increase of a hydraulic braking pressure can be secured, with substantial elimination of the disadvantages inherent in conventional antiskid brake control devices.

In order to accomplish this object of the present invention, an antiskid brake control device for use in a motor vehicle or the like, embodying the present invention reduces a hydraulic braking pressure when wheels of the motor vehicle are in a state towards locking and increases the hydraulic braking pressure when the wheels have recovered from locking, comprising: a hydraulic control means which repeatedly performs changeover from increase of the hydraulic braking pressure to holding of the hydraulic braking pressure during the increase of the hydraulic braking pressure by interrupting the increase of the hydraulic braking pressure temporarily; a timer means which measures time periods for maintaining states of reducing, increasing and holding the hydraulic braking pressure, respectively; a counter means which is reset upon completion of reduction of the hydraulic braking pressure and counts the number of changeover from the increase of the hydraulic braking pressure to the holding of the hydraulic braking pressure and the number of changeover from the holding of the hydraulic braking pressure to the increase of the hydraulic braking pressure; a calculating means for calculating a speed of a vehicle body of the motor vehicle; a decision means which discriminates an average deceleration of the vehicle body into finite steps; the average deceleration being obtained as a change of the speed of the vehicle body, which change is observed during a sufficiently long time after start of antiskid operation; a discrimination means which discriminates into finite steps, the time period for maintaining the state of reducing the hydraulic braking pressure, with the time period being measured by said timer means; a storage means in which the time periods for maintaining the states of increasing and holding the hydraulic braking pressure are set and stored so as to correspond to each of combination of finite outputs of said discrimination means and finite outputs of said decision means, respectively; and a changeover means which, at the time when the wheels have recovered from locking, performs changeover between the increase of the hydraulic braking pressure and the holding of the hydraulic braking pressure in accordance with the time periods for maintaining the states of increasing and holding the hydraulic braking pressure, which time periods are stored in said storage means and correspond to a combination of outputs yielded at said time by said discrimination means and said decision means, respectively.

The antiskid brake control device of the above described arrangement of the present invention is based on an idea that if a hydraulic pressure present at the time when pressure reduction by the hydraulic controller becomes necessary can be estimated, it is possible to determine how long a command of increasing the hydraulic braking pressure should be executed against a predetermined time period for executing a command of reducing the hydraulic braking pressure, so that a necessary braking force can be secured most efficiently and the wheels can be prevented from being again locked at once.

It is natural that a deceleration produced in the vehicle body at the time when the antiskid device is being actuated, namely at the time when the hydraulic braking pressure becomes higher as the wheels approaches a state of locking corresponds substantially to the coefficient of friction $\mu$ of the road surface having the motor vehicle running thereon on the assumption that all the tires are uniformly brought into contact with the road surface. On the other hand, naturally, a braking force required for locking the tires becomes larger as the coefficient of friction $\mu$ becomes higher. Namely, if the deceleration produced in the vehicle body can be estimated, it becomes possible to learn whether or not the hydraulic pressure present at the time of start of locking of the wheels is high and thus, it is possible to decide how the hydraulic braking pressure should be increased again most efficiently.

Furthermore, in the present invention, the time periods for effecting the pressure increase and the pressure holding performed repeatedly when the hydraulic braking pressure is increased again as described above are, respectively, set in accordance with optimum solutions which are obtained empirically from a complicated non-linear model affected by stiffness of the hydraulic braking pressure, differential pressure of the restriction passage of the solenoid valve, etc and are stored in the storage means. Time periods optimum for each time of execution of pressure increase and pressure holding are read from the storage means so as to be outputted, so that optimum antiskid brake control can be secured at all times even in such a complicated non-linear model.

The antiskid brake control device of the present invention includes the timer for measuring the time period required for recovering the wheels set in a state towards locking and the decision means for discriminating the average deceleration of the vehicle body into finite steps, with the average deceleration being obtained as a change of the speed of the vehicle body, which change is observed during a sufficiently long time. Therefore, from the output of the decision means, it is possible to learn level of the hydraulic pressure, at which the hydraulic pressure has been reduced. Meanwhile, since the time period during which the hydraulic pressure has been reduced is known, it is possible to estimate level of the hydraulic pressure, to which the hydraulic pressure has been reduced. Thus, from data obtained from the outputs of the timer and the decision means, the hydraulic pressure can be increased again as follows. Namely, a time period for increasing the hydraulic pressure so as to obtain the necessary braking force and a subsequent time period for increasing the hydraulic pressure slightly so as to prevent the wheels as much as possible from being locked again can be set to optimum time periods of the corresponding combination set preliminarily in the storage means. Furthermore, complicated procedures of increase of the hydraulic pressure to be taken in the case where the empirically determined increase of the hydraulic pressure for obtaining the necessary braking force is desirably divided into two steps without being performed in one step or in the case where amount of increase of the hydraulic pressure is desirably increased gradually without increasing the hydraulic pressure excessively at the initial first and second times such that the hydraulic pressure is again increased slightly after the necessary braking force has been secured can also be achieved easily by setting in the storage means, the pressure increase time period for each of the number of changeover from pressure holding to pressure increase and the pressure holding time period for each of the number of changeover from pressure increase to pressure holding.

Meanwhile, the average vehicle deceleration has a dimension of a differential value of the vehicle speed. In the antiskid device in which the vehicle speed cannot be measured directly, the vehicle speed is generally estimated based on the wheel speed. Thus, the vehicle deceleration obtained by integrating such vehicle speed is affected greatly by methods and accuracy of estimating the vehicle speed. However, in the present invention, since the average vehicle deceleration obtained as the change (difference) of the vehicle speed observed during a sufficiently long time is employed, the vehicle deceleration has accuracy sufficiently high for practical use even in the case where the vehicle deceleration is affected to some extent by methods and accuracy of estimating the vehicle speed. It is to be noted here that the sufficiently long observation time denotes a time period having such a length that at least the differential value (difference) of the vehicle speed is not affected when the wheels are in a state towards locking or the wheels are in a state towards recovery from locking. Generally, the sufficiently long observation time can be longer than a time period during which the brake of the wheels are subjected to reduction of the hydraulic pressure. More concretely, it is desirable that the sufficiently long observation time is set to, for example, about 0.1 to 0.5 sec.

In the control method of the antiskid brake control device of the present invention, if the motor vehicle runs on a road surface whose right and left side portions have vastly different coefficients of friction $\mu$, it becomes impossible to say that the average vehicle deceleration corresponds to the coefficient of friction of the road surface. Namely, control of the brake is performed such that one wheel on one road side portion having the higher coefficient of friction is regarded as being on a road surface having a coefficient of friction lower than the higher coefficient of friction and the other wheel on the other road side portion having the lower coefficient of friction is regarded as being on a road surface having a coefficient of friction higher than the lower coefficient of friction. In this case, if a braking force corresponding to the higher coefficient of friction is immediately applied to the wheel on the road side portion having the higher coefficient of friction, braking forces applied to the right and left wheels become quite different, so that straight line stability of the motor vehicle is aggravated. Hence, regarding the wheel on the road side portion having the higher coefficient of friction, it is desirable that the hydraulic pressure is gradually increased by regarding the coefficient of friction as having a value smaller than the actual coefficient of friction as described above, which poses no problem. On the other hand, since the wheel on the road side portion having the lower coefficient of friction is subjected to the braking force corresponding to the coefficient of friction larger than the actual lower coefficient of friction, a symptom of the wheel being locked again is exhibited in an early stage. However, since stability and controllability of the vehicle body are usually secured sufficiently by the wheel on the road side portion having the higher coefficient of friction, control of the brake is performed without any problem.

Furthermore, if the observation time for calculating the average vehicle deceleration is made sufficiently long, it may be impossible to obtain a vehicle deceleration as a change of the vehicle speed until an initial observation time elapses after start of antiskid operation. However, in this case, it is possible to substitute for the vehicle deceleration, an average vehicle deceleration which is obtained on a time period from start of antiskid operation to arising of need of increasing the hydraulic pressure. Alternatively, it can also be so arranged that in the case where the output of the decision means for discriminating the vehicle deceleration is divided into, for example, three or more steps, the output of the decision means is set to the intermediate step until the initial observation time elapses.

BRIEF DESCRIPTION OF THE DRAWINGS

This object and features of the present invention will become apparent from the following description taken in conjunction with the preferred embodiment thereof with reference to the accompanying drawings, in which:

FIG. 1 is a block diagram of an antiskid brake control device according to one embodiment of the present invention;

FIG. 2 is a graph showing a characteristic curve of stiffness of a hydraulic braking pressure (already referred to)

Before the description of the present invention proceeds, it is to be noted that like parts are designated by like reference numerals throughout several views of the accompanying drawings.

DETAILED DESCRIPTION OF THE INVENTION

Figure 3A:
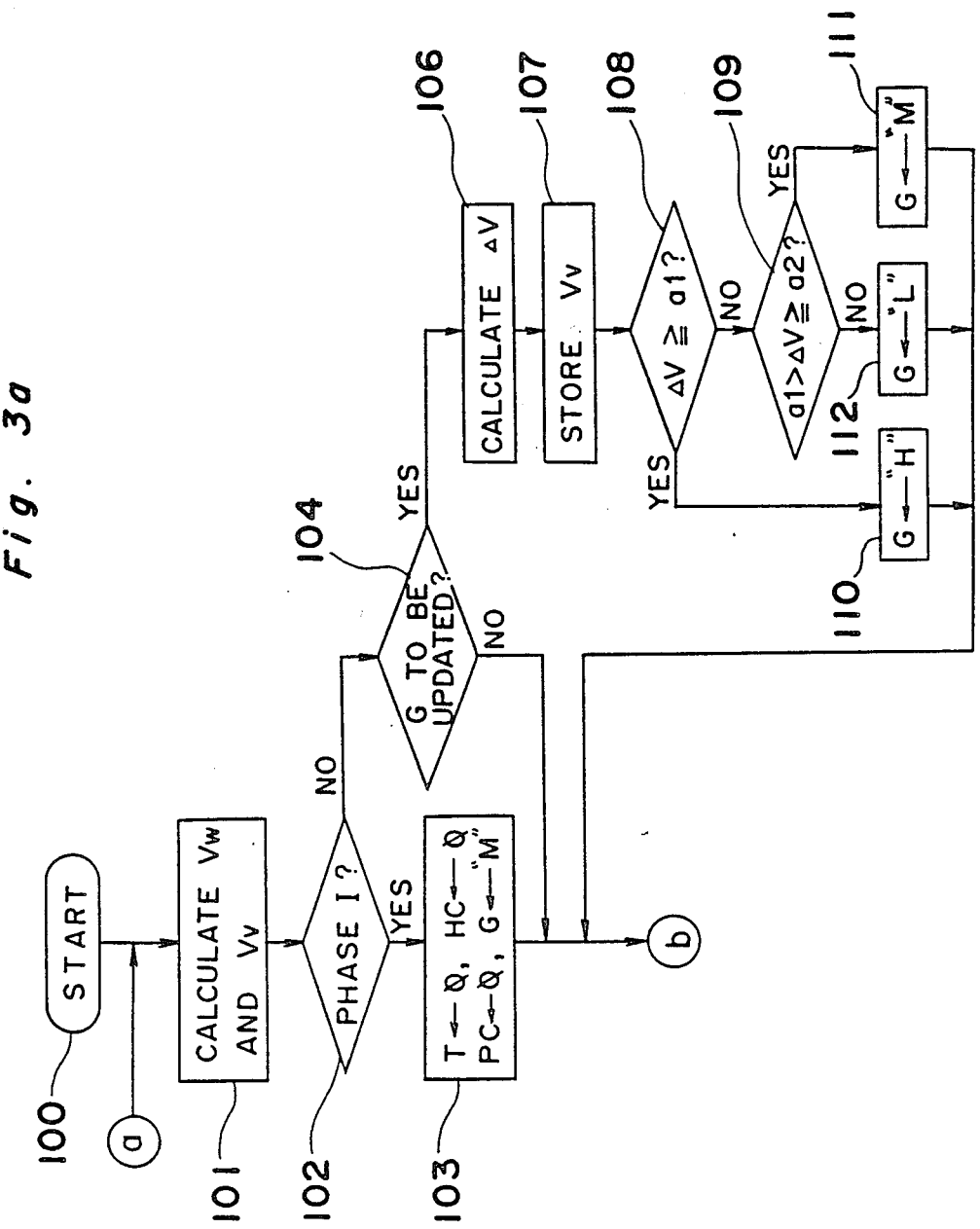
FIGS. 3a, 3b, 3c and 4 are flow charts of operational sequences of the antiskid brake control device of FIG. 1, which sequences are controlled by a microcomputer.
Figure 3B:
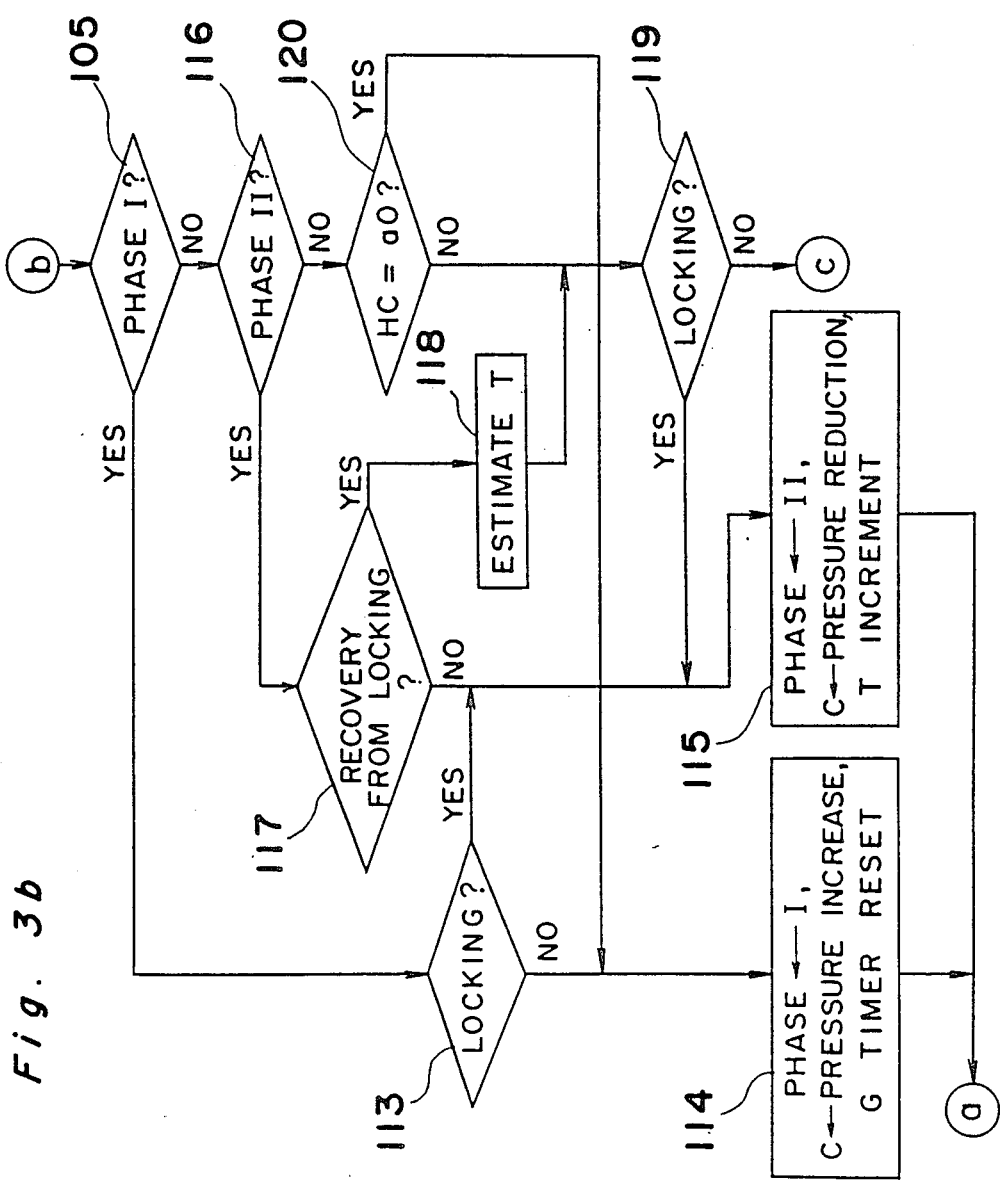
Figure 3C:
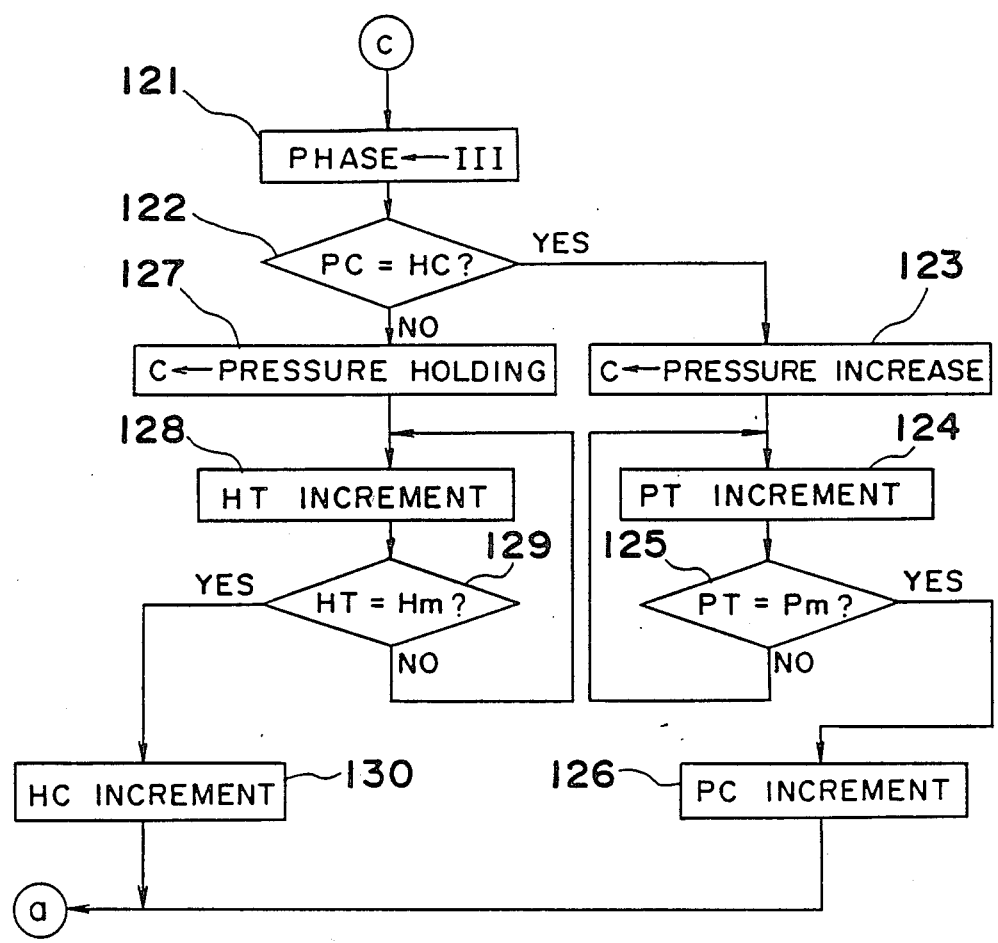

Referring now to the drawings, there is shown in FIG. 1, an antiskid brake control device 1 according to one embodiment of the present invention. The antiskid brake control device 1 is constituted by a wheel speed calculating portion 11 for calculating a speed of each of wheels of a motor vehicle on the basis of an output of a wheel speed sensor 2i for detecting a speed of each of the wheels, a vehicle speed calculating portion 12 for calculating a speed of a vehicle body of the motor vehicle on the basis of the output of the wheel speed sensor 2i, a vehicle deceleration deciding portion 13 for making a decision as to a deceleration of the vehicle body, a locking detecting portion 14 for detecting locking of the wheels, a time discriminating portion 15, a timer portion 16, a counter portion 17, a storage portion 18, a setter 19, a changeover portion 20 for effecting changeover between a pressure increase mode and a pressure holding mode and a hydraulic controller 21 for controlling a hydraulic braking pressure. The control device 1 controls the hydraulic braking pressure of a brake 4i of each of the wheels by giving to a hydraulic actuator 3 a command of increasing, reducing or holding the hydraulic braking pressure.

In the control device 1, the vehicle deceleration deciding portion 13 calculates, on the basis of an output of the vehicle speed calculating portion 12, an average deceleration of the vehicle body as an amount of change in the speed of the vehicle body during a sufficiently long time period of observation after start of antiskid action so as to discriminate the average deceleration into two or more finite steps. On the basis of outputs of the wheel speed calculating portion 11 and the vehicle speed calculating portion 12, the locking detecting portion 14 calculates a slip speed of each of the wheels, i.e. a difference between the vehicle speed and the wheel speed and, on the basis of this calculation result, detects locking of the wheels and recovery of the wheels from locking. The timer portion 16 measures time periods for maintaining states of increasing, reducing and holding the hydraulic braking pressure, which states are commanded by the hydraulic controller 21. On the basis of an output of the timer portion 16, the time discriminating portion 15 discriminates into finite steps, the time period for maintaining the state of reducing the hydraulic braking pressure. Upon completion of reduction of the hydraulic braking pressure in the hydraulic controller 21, the counter portion 17 is reset so as to count the number of changeover from pressure increase to pressure holding and the number of changeover from pressure holding to pressure increase. Time periods for maintaining states of increasing and holding the hydraulic braking pressure, which periods are obtained empirically for each of combinations of finite outputs of the vehicle deceleration deciding portion 13 and finite outputs of the time discrimination portion 15, are set by the setter 19 and stored in the storage portion 18.

The changeover portion 20 receives outputs of the vehicle deceleration detecting portion 13, the locking detecting portion 14, the time discriminating portion 15 and the counter portion 17. At the time when the wheels have started recovering from locking, the changeover portion 20 issues, in accordance with time periods of pressure increase and pressure holding stored in the storage portion 18 and corresponding to a combination of outputs yielded at said time by the vehicle deceleration deciding portion 13 and the time discriminating portion 15, to the hydraulic controller 21 a command of effecting changeover between pressure increase and pressure holding.

Meanwhile, in this embodiment, the time periods for maintaining the states of increasing and holding the hydraulic braking pressure are, respectively, stored in the storage portion 18 for the number of changeover between pressure increase and pressure holding. In accordance with the numbers of the changeover counted by the counter portion 17, the changeover portion 20 selects from the storage portion 18 optimum time periods for maintaining the states of increasing and holding the hydraulic braking pressure. Furthermore, the timer portion 16 measures a sum of the time periods of pressure reduction in pressure reduction and pressure holding performed through changeover thereof during a time period from detection of a locking trend of the wheels upon application of an output of the locking detecting portion 14 to the timer portion 16 to recovery of the wheels from locking. The hydraulic controller 2 receives an output of the locking detecting portion 14 and other predetermined data and issues to the hydraulic actuator 3, commands of increasing, reducing and holding the hydraulic braking pressure. When the hydraulic braking pressure is increased, the hydraulic controller 21 temporarily interrupts pressure increase in accordance with the changeover command from the changeover portion 20 functioning as described above so as to intermittently issue a command of holding the hydraulic braking pressure.

As described above, in the control device 1 of the present invention, when increase of the hydraulic braking pressure becomes necessary in the course of recovery of the wheels from locking, increase and holding of the hydraulic braking pressure are repeated by the changeover portion 20. Furthermore, in accordance with the time period of pressure reduction counted by the timer portion 16 after detection of locking of the wheels and the average vehicle deceleration discriminated at this time by the vehicle deceleration deciding portion 13, the time periods for maintaining the states of increasing and holding the hydraulic braking pressure are selectively set to the optimum values stored preliminarily in the storage portion 18 empirically. Thus, in the hydraulic control device (hydraulic controller 21), even if the controlled variable is not linearly proportional to the commanded time period, a proper amount of increase of the hydraulic braking pressure can be secured and thus, antiskid brake control can be performed effectively.

Control operations of the control device 1 can be performed by a microcomputer having functional blocks as the constituent elements of the control device 1 and are described by way of example with reference to flow charts of FIGS. 3a to 3c and 4, hereinbelow. In this program, a phase I represents a state for commanding only increase of the hydraulic braking pressure, a phase II represents a state for issuing a command of combination of reduction and holding of the hydraulic breaking pressure and a phase III represents a state for issuing a command of combination of increase and holding of the hydraulic braking pressure. When the motor vehicle starts running at step 100, the microcomputer calculates, at predetermined control cycles, a wheel speed Vw, a vehicle speed Vv, a slip speed, i.e. a difference between the wheel speed Vw and the vehicle speed Vv, etc. at step 101. Then, on the basis of arithmetic results of step 101, it is decided at step 102 whether or not the phase I should be executed. In the case of "YES" at step 102, pressure reduction timer T, a pressure holding counter HC and a pressure increase counter PC are reset and an output G of the vehicle deceleration deciding portion 13 is set to an intermediate value M at step 103 followed by step 105. Meanwhile, in this embodiment, the vehicle deceleration G is given by dividing an average vehicle deceleration $\Delta V$ observed during a sufficiently long time period, into three steps, i.e. a large value H, the intermediate value M and a small value L. On the other hand, in the case of "NO" at step 102, it is decided at step 104 whether or not it is time to update the vehicle deceleration G. In the case of "NO" at step 104, the program flow proceeds to step 105.

In the case of "YES" at step 104, the average vehicle deceleration $\Delta V$, i.e. a difference between the vehicle speed Vv calculated and stored at the previous time and a new vehicle speed Vv calculated at this time is obtained at step 106 and the new vehicle speed Vv obtained at this time is stored at step 107. Then, at steps 108 and 109, the average vehicle deceleration ΔV is divided into the above described three steps by using two threshold values a1 and a2 of the average vehicle deceleration ΔV. Namely, at step 108, it is decided whether or not the equation of (ΔV≧a1) is satisfied. In the case of "YES" at step 108, the output G of the vehicle deceleration deciding portion 13 is set to the large value H at step 110 and the program flow proceeds to step 105. In the case of "NO" at step 108, it is decided at step 109 whether or not the equation of (a1>ΔV≧a2) is satisfied. In the case of "YES" at step 109, the output G of the vehicle deceleration deciding portion 13 is set to the intermediate value M at step 111 followed by step 105. In the case of "NO" at step 109, namely if ΔV<a2, the output G of the vehicle deceleration deciding portion 13 is set to the small value L at step 112 followed by step 105.

At step 105, a decision is made as to whether or not the control device 1 is currently in the phase I. In the case of "YES" at step 105, it is decided at step 113 whether or not the wheels are in a state towards locking. In the case of "NO" at step 113, the phase I is designated, a command C of controlling the hydraulic braking pressure is so set as to increase the hydraulic braking pressure and a timer for updating the output G of the vehicle deceleration deciding portion 13 is reset at step 114 and then, the program flow returns to step 101. Meanwhile, in the case of "YES" at step 113, the phase II is designated, the command C of controlling the hydraulic braking pressure is so set as to reduce the hydraulic braking pressure and an increment of a time period for the pressure reduction is imparted to the pressure reduction timer T at step 115 and then, the program flow returns to step 101.

Figure 4:
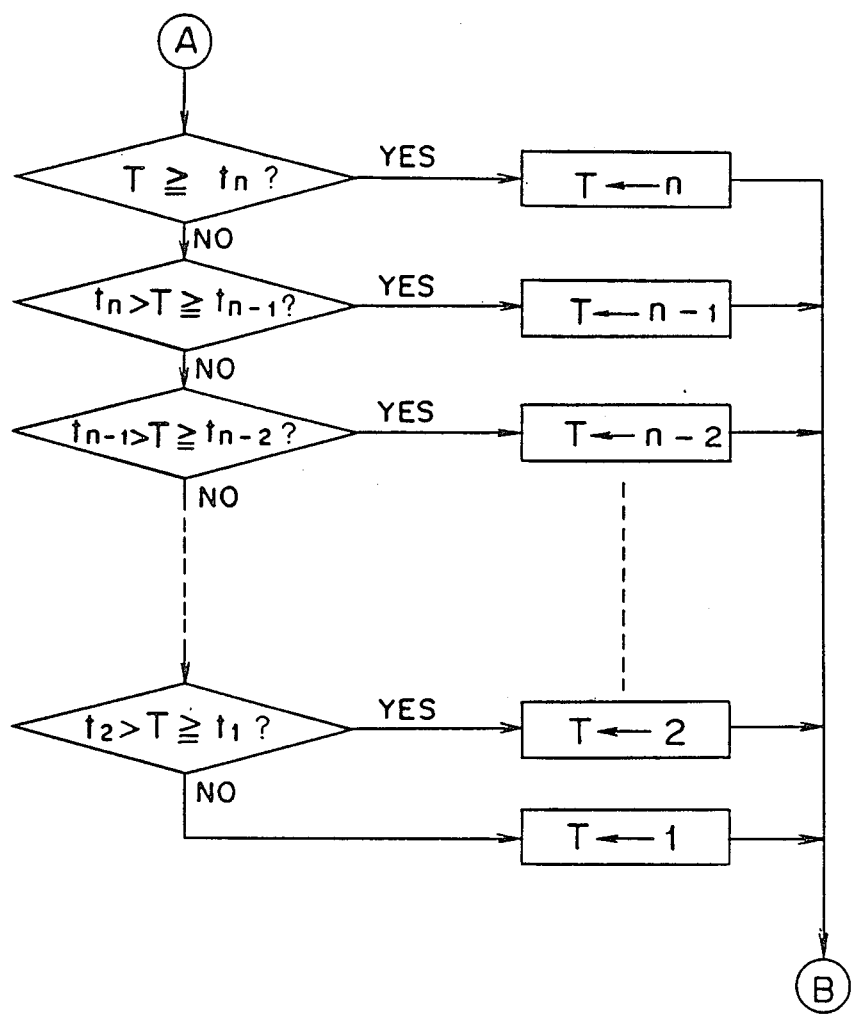

In the case of "NO" at step 105, a decision is made at step 116 as to whether or not the control device 1 is currently in the phase II. In the case of "YES" at step 116, it is decided at step 117 whether or not the wheels have started recovering from locking. In the case of "NO" at step 117, the program flow returns to step 101 through step 115. On the other hand, in the case of "YES" at step 117, the content of the pressure reduction timer T is estimated at step 118 by using, for example, a program of a flow chart from a start connector Ⓐ to an end connector Ⓑ as shown in FIG. 4 and then, the program flow proceeds to step 119. Meanwhile, in the flow chart of FIG. 4, time period counted by the pressure reduction timer T is divided into n steps (n=natural number).

In the case of "NO" at step 116, namely if the control device 1 is currently in the phase III, it is decided at step 120 whether or not the content of the pressure holding counter HC has reached a predetermined number a0 of changeover to pressure holding. In the case of "YES" at step 120, the program flow returns to step 101 via step 114. On the other hand, in the case of "NO" at step 120, it is decided at step 119 whether or not the wheels are in a state towards locking. In the case of "YES" at step 119 the program flow returns to step 101 by way of step 115. Meanwhile, in the case of "NO" at step 119, the phase III is designated at step 121. Namely, pressure increase and pressure holding are performed through changeover thereof in accordance with time periods for maintaining the states of increasing and holding the hydraulic braking pressure, which time periods are determined by the subsequent steps.

When the phase III has been designated at step 121 as described above, it is decided at step 122 whether or not the content of the pressure increase counter PC is equal to the content of the pressure holding counter HC. In the case of "YES" at step 122, the command C of controlling the hydraulic braking pressure is so set as to increase the hydraulic braking pressure at step 123 and an increment of a time period for the pressure increase is imparted to a pressure increase timer PT at step 124 followed by step 125. At step 125, it is decided whether or not the content of the pressure increase timer PT has reached a stored value Pm of a time period for pressure increase, which corresponds to the average vehicle deceleration ΔV decided in steps 106 to 112 and the time period for pressure reduction estimated at step 118. In the case of "YES" at step 125, an increment of time is imparted to the pressure increase counter PC for counting the number of pressure increase at step 126 and then, the program flow returns to step 101. In the case of "NO" at step 125, the program flow returns to step 124, an increment is imparted to the pressure increase timer PT repeatedly until the content of the pressure increase timer PT reaches the time period Pm.

In the case of "NO" at step 122, the command of controlling the hydraulic braking pressure is so set as to hold the hydraulic braking pressure at step 127 and an increment of a time period for the pressure holding is imparted to a pressure holding timer HT at step 128 followed by step 129. At step 129, a decision is made as to whether or not the content of the pressure holding timer HT has reached a stored value Hm of a time period for pressure holding, which corresponds to the average vehicle deceleration ΔV decided in steps 106 to 112 and the time period for pressure reduction decided at step 118. In the case of "YES" at step 129, an increment of time is imparted to the pressure holding counter HC at step 130 and then, the program flow returns to step 101. In the case of "NO" at step 129, the program flow returns to step 128 at which an increment of time is imparted to the pressure holding timer HT repeatedly until the content of the pressure holding timer HT reaches the stored value Hm.

As is clear from the foregoing, in the antiskid brake control device of the present invention, the average vehicle deceleration and the time period for pressure reduction are divided into finite steps and the optimum time periods for pressure increase and pressure holding, which are empirically set and stored so as to correspond to the divided average vehicle deceleration and time period for pressure reduction, are read from the storage means such that the time periods for pressure increase and pressure holding repeated a plurality of times when pressure increase is necessary in the course of recovery of the wheels from locking are obtained.

Therefore, in accordance with the present invention, even if the controlled variable is not linearly proportional to the time period for executing the command in the hydraulic control device, a proper amount of increase of the hydraulic braking pressure can be secured, so that antiskid performances of the motor vehicle are improved greatly.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An antiskid brake control device for use in a motor vehicle or the like, which reduces a hydraulic braking pressure when wheels of the motor vehicle are in a state towards locking and increases the hydraulic braking pressure when the wheels have recovered from locking, comprising:

a hydraulic control means which repeatedly performs changeover from increase of the hydraulic braking pressure to holding of the hydraulic braking pressure during the increase of the hydraulic braking pressure by interrupting the increase of the hydraulic braking pressure temporarily;

a timer means which measures time periods for maintaining states of reducing, increasing and holding the hydraulic braking pressure, respectively;

a counter means which is reset upon completion of reduction of the hydraulic braking pressure and counts the number of changeover from the increase of the hydraulic braking pressure to the holding of the hydraulic braking pressure and the number of changeover from the holding of the hydraulic braking pressure to the increase of the hydraulic braking pressure;

a calculating means for calculating a speed of a vehicle body of the motor vehicle;

a decision means which discriminates an average deceleration of the vehicle body into finite steps;

the average deceleration being obtained as a change of the speed of the vehicle body, which change is observed during a sufficiently long time after start of antiskid operation;

a discrimination means which discriminates into finite steps, the time period for maintaining the state of reducing the hydraulic braking pressure, with the time period being measured by said timer means;

a storage means in which the time periods for maintaining the states of increasing and holding the hydraulic braking pressure are set and stored so as to correspond to each of combinations of finite outputs of said discrimination means and finite outputs of said decision means, respectively; and a changeover means which, at the time when the wheels have recovered from locking, performs changeover between the increase of the hydraulic braking pressure and the holding of the hydraulic braking pressure in accordance with the time periods for maintaining the states of increasing and holding the hydraulic braking pressure, which time periods are stored in said storage means and correspond to a combination of outputs yielded at said time by said discrimination means and said decision means, respectively.

2. An antiskid brake control device as claimed in claim 1, wherein each of the time periods for maintaining the states of increasing and holding the hydraulic braking pressure is set for each of the number of changeover between the increase of the hydraulic braking pressure and the holding of the hydraulic braking pressure.

3. An antiskid brake control device as claimed in claim 1, wherein said timer means measures a sum of time periods for the reduction of the hydraulic braking pressure in the reduction and the holding of the hydraulic braking pressure performed through changeover thereof during a time interval from detection of the wheels being in the state towards locking to recovery of the wheels from locking so as to set the sum as the time period for maintaining the state of holding the hydraulic braking pressure.

4. An antiskid brake control device as claimed in claim 2, wherein said timer means measures a sum of time periods for the reduction of the hydraulic braking pressure in the reduction and the holding of the hydraulic braking pressure performed through changeover thereof during a time interval from detection of the wheels being in the state towards locking to recovery of the wheels from locking so as to set the sum as the time period for maintaining the state of holding the hydraulic braking pressure.

* * * * *